United States Patent
Cho et al.

(10) Patent No.: US 11,954,942 B2
(45) Date of Patent: Apr. 9, 2024

(54) HUMAN BEHAVIOR RECOGNITION SYSTEM AND METHOD USING HIERARCHICAL CLASS LEARNING CONSIDERING SAFETY

(71) Applicant: KOREA INSTITUTE OF SCIENCE AND TECHNOLOGY, Seoul (KR)

(72) Inventors: Junghyun Cho, Seoul (KR); Ig Jae Kim, Seoul (KR); Hochul Hwang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 288 days.

(21) Appl. No.: 17/565,453

(22) Filed: Dec. 30, 2021

(65) Prior Publication Data
US 2022/0207920 A1 Jun. 30, 2022

(30) Foreign Application Priority Data
Dec. 31, 2020 (KR) .................. 10-2020-0189449

(51) Int. Cl.
*G06V 40/20* (2022.01)
*G06V 10/82* (2022.01)
*G06V 10/84* (2022.01)

(52) U.S. Cl.
CPC .............. *G06V 40/23* (2022.01); *G06V 10/82* (2022.01); *G06V 10/84* (2022.01)

(58) Field of Classification Search
CPC ......... G06V 40/23; G06V 10/84; G06V 10/82
See application file for complete search history.

(56) References Cited

U.S. PATENT DOCUMENTS

2018/0314897 A1  11/2018  Camilus et al.
2019/0180090 A1  6/2019  Jiang et al.
(Continued)

FOREIGN PATENT DOCUMENTS

JP  2004-78304 A  3/2004
JP  4961912 B2  6/2012
(Continued)

OTHER PUBLICATIONS

Penghao Zhou et al., "Relation Parsing Neural Network for Human-Object Interaction Detection," 2019 IEEE/CVF International Conference on Computer Vision, 2019, pp. 843-851.

*Primary Examiner* — David F Dunphy
(74) *Attorney, Agent, or Firm* — CANTOR COLBURN LLP

(57) ABSTRACT

Embodiments relate to a human behavior recognition system using hierarchical class learning considering safety, the human behavior recognition system including a behavior class definer configured to form a plurality of behavior classes by sub-setting a plurality of images each including a subject according to pre-designated behaviors and assign a behavior label to the plurality of images, a safety class definer configured to calculate a safety index for the plurality of images, form a plurality of safety classes by sub-setting the plurality of images based on the safety index, and additionally assign a safety label to the plurality of images, and a trainer configured to train a human recognition model by using the plurality of images defined as hierarchical classes by assigning the behavior label and the safety label as training images.

21 Claims, 8 Drawing Sheets

BEHAVIOR RECOGNITION MODEL

(56) References Cited

U.S. PATENT DOCUMENTS

| | | |
|---|---|---|
| 2019/0295278 A1 | 9/2019 | Kim et al. |
| 2020/0019779 A1 | 1/2020 | Maeng et al. |
| 2022/0067547 A1* | 3/2022 | Kwatra .................. G06N 5/04 |
| 2022/0277592 A1* | 9/2022 | Hosono .................. G06T 3/60 |

FOREIGN PATENT DOCUMENTS

| | | |
|---|---|---|
| KR | 10-2018-0022366 A | 3/2018 |
| KR | 10-1980551 B1 | 5/2019 |
| KR | 10-2019-0098781 A | 8/2019 |
| KR | 10-2019-0100085 A | 8/2019 |
| KR | 10-2019-0110227 A | 9/2019 |

* cited by examiner

HUMAN BEHAVIOR RECOGNITION SYSTEM AND METHOD USING HIERARCHICAL CLASS LEARNING CONSIDERING SAFETY

DESCRIPTION ABOUT NATIONAL RESEARCH AND DEVELOPMENT SUPPORT

This study was supported by the Ministry of Science and ICT (Project Name: Development of real-environment human care robot technology for aging society, Project No.: 1711103145) under the superintendence of the Institute for Information & Communications Technology Planning & Evaluation.

CROSS-REFERENCE TO RELATED APPLICATION

This application claims priority to Korean Patent Application No. 10-2020-0189449, filed on Dec. 31, 2020, and all the benefits accruing therefrom under 35 U.S.C. § 119, the contents of which in its entirety are herein incorporated by reference.

BACKGROUND OF THE INVENTION

Field of the Invention

The present disclosure relates to a human behavior recognition system and method for recognizing a human behavior in consideration of factors in various aspects, by having a behavior recognition model trained by using training data that hierarchically defines classes to consider factors other than a behavior, such as safety.

Description of the Related Art

In modern society, the proportion of the elderly population is gradually increasing. In the past, children of elderly parents cared for the elderly parents. However, recently, due to a change in a social structure, the proportion of children caring for the elderly person has greatly decreased, and thus caring for the elderly person has emerged as an important social problem.

With the development of robotics and image recognition technology, there are attempts to solve the problem of caring for the elderly person by using a care robot equipped with a behavior recognition model trained to recognize a human behavior in an image. A conventional behavior recognition model is an artificial neural network model configured to recognize a behavior taken by a person by extracting features from an input image.

FIG. 1 is a diagram illustrating classes of image data to be used to train a conventional behavior recognition model. FIG. 2 is a conceptual diagram illustrating that the conventional behavior recognition model trained by using training data having the classes of FIG. 1 recognizes a behavior of an elderly person.

Referring to FIG. 1, before the conventional behavior recognition model is trained, a plurality of behavior classes are generated by respectively sub-setting a plurality of image data to a plurality of behaviors to be recognized. To a plurality of image data sub-set as the same behavior class, label data indicating a corresponding behavior is assigned. The conventional behavior recognition model is trained by using a plurality of training samples each including image data and label data for corresponding images.

Because a large database that may be easily used as training samples has been open and a deep learning model with high recognition performance has been developed, recognition performance for a daily life behavior in a limited environment is relatively high. This is because the large open database that may be used for behavior recognition includes image data showing daily life behaviors such as watching TV, cooking, and lying down.

Accordingly, as shown in FIG. 2, the conventional behavior recognition model has high performance in recognizing daily life behaviors such as watching TV, cooking, and lying down.

The elderly person who are to interact with care robots belong to a social group with a highest suicide rate, and have a relatively high frequency of dangerous behaviors such as hanging and falling, when compared to other social groups. However, there is a limitation in that the open database used in the conventional behavior recognition model has relatively small data related to such dangerous behaviors, and thus care robots fail to accurately recognize the dangerous behaviors requiring a most active response. For example, as shown in FIG. 2, a care robot may fail to recognize a hanging behavior of an elderly person or may mistake a falling behavior as a lying down behavior.

Also, as shown in FIG. 1, because the conventional behavior recognition model is trained by considering each behavior as an independent class, there is another limitation in that important factors in behavior recognition of care robots for the elderly person such as safety or an association between behaviors are overlooked.

Accordingly, it is necessary to develop care robots to which a behavior recognition system for strongly recognizing even emergency behaviors such as suicide is applied.

SUMMARY OF THE INVENTION

According to embodiments of the present disclosure, there are provided a human behavior recognition system and method for more strongly recognizing a human behavior including an emergency behavior such as suicide, by having a behavior recognition model trained by using training data that hierarchically defines classes to consider factors other than a behavior.

A human behavior recognition system using hierarchical class learning considering safety according to an embodiment includes: a behavior class definer configured to form a plurality of behavior classes by sub-setting a plurality of images each including a subject according to pre-designated behaviors and assign a behavior label to the plurality of images, wherein each behavior class includes images with same or similar behaviors of the subject, and a same behavior label is assigned to images included in a same behavior class; a safety class definer configured to calculate a safety index for the plurality of images, form a plurality of safety classes by sub-setting the plurality of images based on the safety index, and additionally assign a safety label to the plurality of images, wherein an object different from the subject in the image is recognized and the safety index is evaluated based on a pose of the recognized object with respect to the subject; and a trainer configured to train a human recognition model by using the plurality of images defined as hierarchical classes by assigning the behavior label and the safety label as training images.

In an embodiment of the present disclosure, the human behavior recognition system may further include a robot response class definer configured to, based on the behavior class and the safety class defined for the plurality of images, form a plurality of robot response classes by sub-setting the plurality of images according to robot responses for interacting with the subject of the image, and additionally assign a response label to the plurality of images, wherein the trainer is further configured to train the behavior recognition model by using the plurality of images defined as hierarchical classes by assigning the behavior label, the safety label, and the response label as training images.

In an embodiment of the present disclosure, the human behavior recognition system may further include a recognizer configured to recognize a behavior of a person in the image by inputting subject image data to the trained behavior recognition model, and evaluate safety of the recognized behavior.

In an embodiment of the present disclosure, the plurality of behavior classes may include one or more behavior classes related to a real life situation and one or more behavior classes related to an emergency situation, wherein the emergency situation includes at least one of suicide and accident.

In an embodiment of the present disclosure, the plurality of images may include images depicting the emergency situation, wherein at least one of the images depicting the emergency situation is generated by rendering an augmented model that implements an emergency behavior in a virtual space.

In an embodiment of the present disclosure, the at least one image depicting the emergency situation, generated by rendering the augmented model may be an image in which a virtual object implemented in the virtual space and a real subject interact with each other in an augmented reality.

In an embodiment of the present disclosure, the behavior class definer may include a three-dimensional (3D) human pose estimation algorithm for calculating position information of a joint of the subject and recognizing a behavior of the subject based on the calculated position information of the joint.

In an embodiment of the present disclosure, the 3D human pose estimation algorithm may be further configured to output a reliability score related to a position of the joint for each pixel in an input image.

In an embodiment of the present disclosure, the safety class definer may include: an object recognition sub-model for recognizing the object; and a six-dimensional (6D) pose estimation algorithm for estimating a pose of the object to calculate a safety index, wherein the safety label includes a first label indicating safety or a second label indicating emergency.

In an embodiment of the present disclosure, the behavior recognition model may include a graph convolutional neural network, wherein the trainer is further configured to train on a parameter included in the graph convolutional neural network, by using hierarchically defined image data as training data.

A human behavior recognition method using hierarchical class learning considering safety performed by a processor according to an embodiment includes: a step of obtaining a plurality of images each including a subject; a behavior class defining step of forming a plurality of behavior classes by sub-setting the plurality of images each including the subject according to pre-designated behaviors and assigning a behavior label to the plurality of images, wherein each behavior class includes images with same or similar behaviors of the subject, and a same behavior label is assigned to images included in a same behavior class; a safety class defining step of calculating a safety index for the plurality of images, forming a plurality of safety classes by sub-setting the plurality of images based on the safety index, and additionally assigning a safety label to the plurality of images, wherein an object different from the subject in the image is recognized and the safety index is evaluated based on a pose of the recognized object with respect to the subject; and a training step of training a behavior recognition model by using the plurality of images defined as hierarchical classes by assigning the behavior label and the safety label as training images.

In an embodiment of the present disclosure, the human behavior recognition method may further include a robot response class defining step of, based on the behavior class and the safety class defined for the plurality of images, forming a plurality of robot response classes by sub-setting the plurality of images according to robot responses for interacting with the subject in the image, and additionally assigning a response label to the plurality of images, wherein the training step includes training the behavior recognition model by using the plurality of images defined as hierarchical images by assigning the behavior label, the safety label, and the response label as training images.

In an embodiment of the present disclosure, the human behavior recognition method may further include a recognizing step of recognizing a behavior of a person in the image by inputting subject image data to the trained behavior recognition model, and evaluating safety of the recognized behavior.

In an embodiment of the present disclosure, the plurality of behavior classes may include one or more behavior classes related to a real life situation and one or more behavior classes related to an emergency situation, wherein the emergency situation includes at least one of suicide and accident.

In an embodiment of the present disclosure, the plurality of images may include images depicting the emergency situation, wherein at least one of the images depicting the emergency situation is generated by rendering an augmented model that implements an emergency behavior in a virtual space.

In an embodiment of the present disclosure, the at least one image depicting the emergency situation, generated by rendering the augmented model may be an image in which a virtual object implemented in the virtual space and a real subject interact with each other in an augmented reality.

In an embodiment of the present disclosure, a behavior class definer may include a three-dimensional (3D) human pose estimation algorithm for calculating position information of a joint of the subject and recognizing a behavior of the subject based on the calculated position information of the joint.

In an embodiment of the present disclosure, the 3D human pose estimation algorithm may be further configured to output a confidence score related to a position of the joint for each pixel in an input image.

In an embodiment of the present disclosure, a safety class definer may include: an object recognition sub-model for recognizing the object; and a six-dimensional (6D) pose estimation algorithm for estimating a pose of the object to calculate a safety index, wherein the safety label includes a first label indicating safety or a second label indicating emergency.

In an embodiment of the present disclosure, the behavior recognition model may include a graph convolutional neural network, wherein the training step includes training on a parameter included in the graph convolutional neural network, by using hierarchically defined image data as training data.

A human behavior recognition system according to an aspect of the present disclosure more accurately recognizes a human behavior, by using a behavior recognition model trained to recognize behaviors in various aspects by hierarchically defining classes to consider factors other than a behavior such as safety.

In this case, image data generated by depicting an emergency behavior, which is difficult to obtain in a real environment, in a virtual space may be used as at least part of training data for training the behavior recognition model.

The effects of the present disclosure are not limited to the above-mentioned effects, and other effects not mentioned herein will be clearly understood by one of ordinary skill in the art from the appended claims.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure. Additionally, for clarity of explanation, some elements in the accompanying drawings may be depicted in variously changed forms such as exaggeration and omission.

DETAILED DESCRIPTION OF THE PREFERRED EMBODIMENTS

The terminology used herein is for the purpose of describing particular embodiments only and is not intended to be limiting of the present disclosure. Unless expressly stated to the contrary, the singular forms as used herein include the plural forms as well. The term "comprises" used herein specifies the presence of stated features, regions, integers, steps, operations, items, and/or components, but does not preclude the presence or addition of one or more other features, regions, integers, steps, operations, items, and/or components.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

In the specification, a label is an answer desired to be derived when a feature vector passes through a machine learning model. When the machine learning model is configured to classify a class to which the feature vector belongs, the derived label corresponds to the class to which the feature vector is predicted to belong.

Embodiments of the present disclosure will be described in detail with reference to the drawings.

Figure 3:
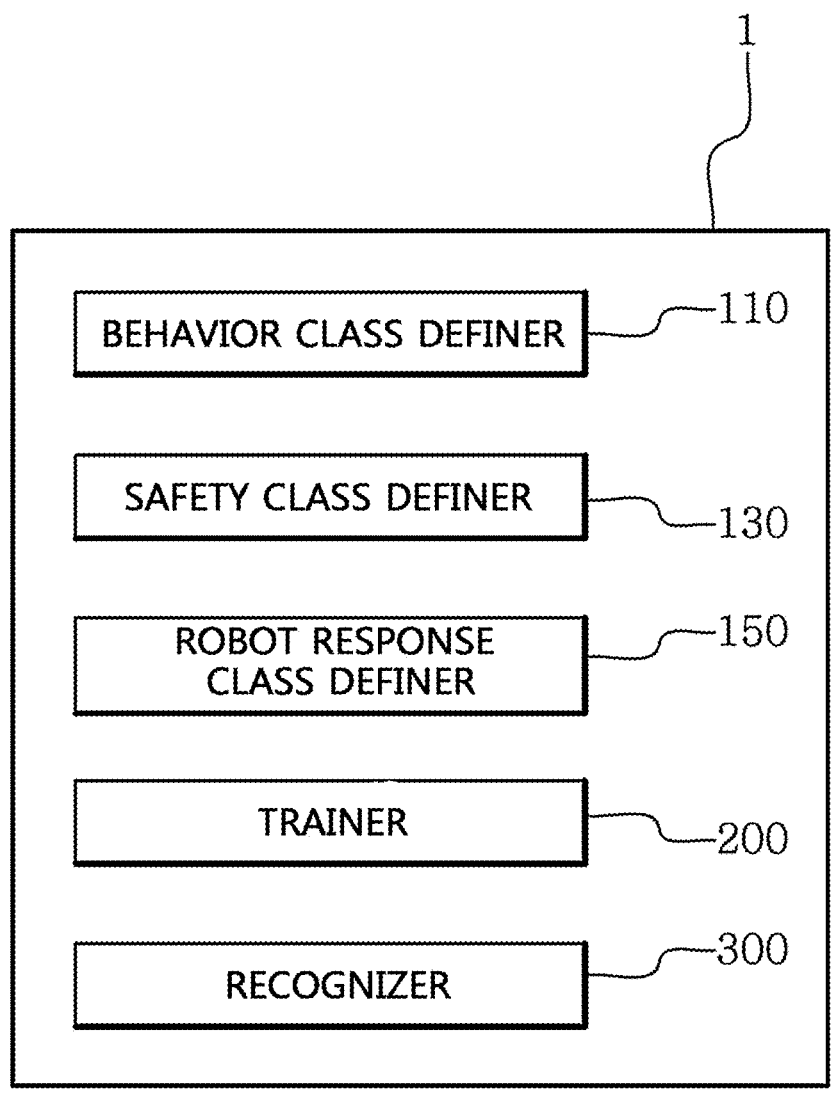
FIG. 3 is a conceptual block diagram illustrating a human behavior recognition system, according to an embodiment of the present disclosure.

FIG. 3 is a conceptual block diagram illustrating a human behavior recognition system, according to an embodiment of the present disclosure.

A human behavior recognition system 1 using a safety index and hierarchical class learning according to embodiments of the present disclosure may recognize a human behavior of subject image data through a behavior recognition model trained by using training data that hierarchically defines classes in behavior and safety aspects by using the safety index, without simply using a human behavior class for learning, may calculate a safety index of the recognized human behavior, and may evaluate the safety of the human behavior. Also, the behavior recognition model outputs a response of a care robot based on the recognized human behavior and the evaluated safety index. The output response is used as a command for performing a care operation of the care robot.

Referring to FIG. 3, the human behavior recognition system 1 includes a recognizer 300 including a trained behavior recognition model. The recognizer 300 recognizes a behavior of a person in an image by inputting subject image data to the trained behavior recognition model, and evaluates the safety of the recognized behavior. Also, in some embodiments, the human behavior recognition system 1 may further include a behavior class definer 110, a safety class definer 130, a robot response class definer 150, and a trainer 200.

The human behavior recognition system 1 according to embodiments may be entirely hardware, or may be partially hardware and partially software. For example, the term "system" may collectively refer to a device for transmitting and receiving data of a specific format and content through electronic communication and software related to the device. In the specification, the term such as "unit", "module", "server", "system", "device", or "terminal" is indented to refer to a combination of hardware and software driven by the hardware. For example, hardware used herein may be a data processing device including a central processing unit (CPU) or another processor. Also, software driven by hardware may refer to a running process, an object, an executable file, a thread of execution, or a program.

The human behavior recognition system 1 obtains a plurality of image data. A plurality of images include a subject whose behavior is to be recognized. The subject is a person. In specific embodiments, the subject may be an elderly person cared by a care robot.

Also, some or all of the plurality of images may further include an object different from the subject. The object that is not a person may be a sold object interacting with the subject. The object may be, for example, a knife held by the subject.

The human behavior recognition system 1 may obtain at least a part or the whole of a sequence as the plurality of images.

In an embodiment, the plurality of image data may be obtained by a vision sensor installed in the care robot.

Classes for the plurality of image data are hierarchically defined by the behavior class definer 110, the safety class definer 130, and the robot response class definer 150.

Figure 4:
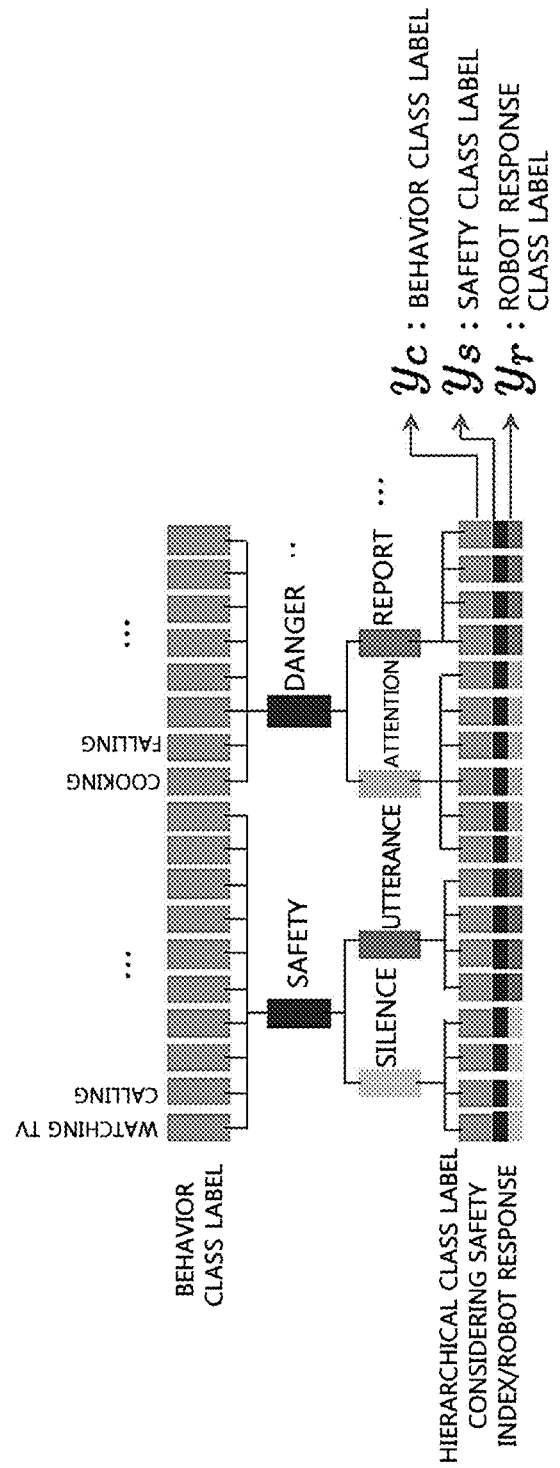
FIG. 4 is a conceptual diagram for hierarchically sub-setting image data, according to an embodiment of the present disclosure.

FIG. 4 is a conceptual diagram for hierarchically sub-setting image data, according to an embodiment of the present disclosure.

Referring to FIG. 4, the behavior class definer 110 sub-sets image data in a behavior aspect and defines the image data as a behavior class.

The behavior class is formed by sub-setting the image data of the same or similar behavior of a person in an image. The behavior class corresponds to a behavior to be recognized by a care robot.

The behavior of the person corresponding to the behavior class includes a daily life behavior such as watching TV, eating food, pouring into a cup, swallowing medicine, drinking, hanging laundry, reading a newspaper, reading a book, clapping, doing bare-handed exercise, turning the neck, shaking hands, hugging, moving hands from side to side, beckoning, pointing with a finger, opening a door, getting up, or standing and lying down, and an emergency behavior such as hanging or falling. When a subject of an image watches TV, a behavior label indicating "watching TV" is assigned to the image.

The behavior class definer 110 may include a three-dimensional (3D) human pose estimation algorithm for recognizing a behavior taken by the subject, by estimating a pose of the subject by estimating a joint position of the subject in the image. The behavior class definer 110 associates behavior label data with a pose estimation result of the subject by the 3D human pose estimation algorithm and assigns the same.

The pose estimation result includes pose information, and/or information to be used to estimate the pose. The information to be used to estimate the pose may include, for example, position information of a joint. Also, in some embodiments, the pose estimation result may further include a confidence score described below.

In an embodiment, the 3D human pose estimation algorithm may include a joint estimation sub-model for estimating a position of a joint of the subject in the image. The behavior class definer 110 may obtain position information of at least one joint of the subject included in input data by calculating the input data by using the joint estimation sub-model.

In order to estimate a position of a joint of the subject, the position of the joint may be estimated based on regional features such as an edge and color distribution of a body part of the subject, and/or global features such as an edge with respect to the entire body of the subject included in image data. The joint estimation sub-model may include a layer (or a network) for processing the regional features and/or the global features of the image data to estimate the position of the joint. For example, a dimension reduction network and/or a dimension restoration network may be included.

In some embodiments, the joint estimation sub-model may be further configured to output a confidence score related to a position of a joint for each pixel in input data. For example, the joint estimation sub-model may output a confidence score, by outputting a heat map including position information of a joint for each pixel and a confidence score of the joint.

The behavior class definer 110 associates behavior label data with a pose estimation result including position information of a joint and a confidence score and assigns the same to image data. Accordingly, when the position information of the joint is obtained by the 3D human pose estimation algorithm, the position information of the joint and the behavior label data corresponding to a behavior taken by the subject is associated with an input image. For example, (x, y, z) that is 3D position information of the joint, the confidence score, and a behavior label are associated with the input image.

The joint estimation sub-model is trained to output a probability that at least one joint of the subject is to be located for each pixel in input data, and may be trained by back-propagating an error of the output probability that the joint is to be located for each pixel and position information of the joint of the subject which is labeled.

As such, the behavior class definer 110 forms a plurality of behavior classes by sub-setting a plurality of image data through the 3D pose estimation algorithm, and assigns behavior label data to the plurality of image data according to the behavior classes.

The safety class definer 130 additionally defines a safety class for a plurality of image data for which a behavior class is already defined. The safety class definer 130 may recognize an object that is different from the subject in an image and is related to the subject, may calculate a safety index indicating a degree of safety of the subject in a situation in the image by estimating a pose of the object with respect to the subject, and may define a safety class based on the safety index.

The safety class in which the safety index is graded may be defined. The calculated safety index is assigned as safety label data to corresponding image data.

In an embodiment, the safety class definer 130 may include an object recognition sub-model for recognizing the object in the image, and a six-dimensional (6D) pose estimation algorithm for estimating a pose of the object.

The object recognition sub-model may be any of various machine learning models for extracting features in the image and recognizing the object.

In some embodiments, the object recognition sub-model may recognize a solid object mainly used in a daily life situation and/or an emergency situation of an elderly person as an object. For example, the object recognition sub-model is configured to recognize objects including a knife, a knot, and a poison container (e.g., bottle).

The 6D pose estimation algorithm estimates a pose of the object recognized in the image with respect to the subject, unlike the 3D human pose estimation algorithm.

The safety class includes a first class indicating danger and a second class indicating safety. The safety class definer 130 calculates a safety index indicating whether the subject in the image is in a safe situation or a dangerous situation based on a recognized human behavior and an estimated object pose.

Figure 2:
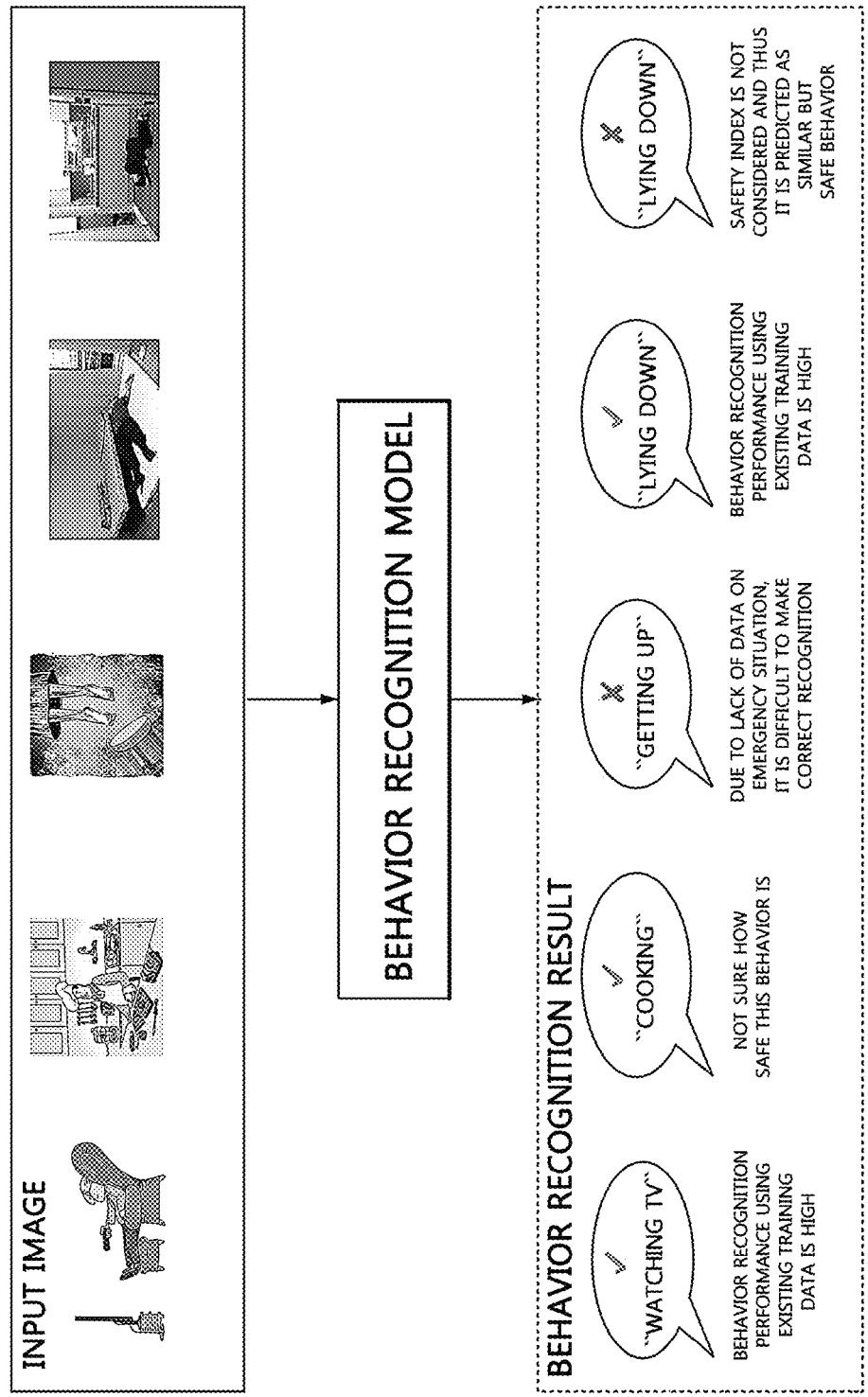
FIG. 2 is a conceptual diagram illustrating that the conventional behavior recognition model trained by using training data having the classes of FIG. 1 recognizes a behavior of an elderly person.

For example, according to the conventional behavior recognition model of FIG. 2, a behavior of the subject who is cooking is simply classified as "cooking", but a "gas stove" used by the subject who is cooking or located around the subject is not considered. In contrast, according to the behavior recognition model of the present disclosure, the "gas stove" is recognized through the object recognition sub-model as a dangerous object. Finally, the safety class definer 130 may calculate a safety index by considering an interaction between a behavior of the subject and a pose of the gas stove recognized in the image with respect to the subject, and may assign a first class label indicating danger.

In an embodiment, the safety index may be scaled to a value between 0 and 1. In an embodiment, the safety class definer 130 may be configured so that as the safety index is closer to 1, a safer situation is indicated. However, the present disclosure is not limited thereto, in another embodiment, the safety class definer 130 may be configured so that as the safety index is closer to 0, a safer situation is indicated.

Each safety class may be set as a range of a safety index. In the above embodiment, the first class indicating danger may be designated as a value of a safety index of 0 to 0.5, and the second class indicating safety may be designated as a value of a safety index of 0.5 to 1. The safety class definer 130 determines a class corresponding to a range to which a value of a safety index belongs as a safety class.

Also, the safety class definer 130 associates safety label data with a pose estimation result including 6D position information of the object and additionally assigns the same to the image data. Accordingly, (x, y, z) that is 6D position information of the object and a safety label are associated with the input image.

For example, when the subject holds a rope to tie an arbitrary object, according to the behavior recognition model of the present disclosure, the "rope" may be recognized as a dangerous object related to a "hanging" behavior through the object recognition sub-model. However, finally, the safety class definer 130 may calculate a safety index by considering a behavior of the subject tying the arbitrary object with the rope and a pose of the rope recognized in the image with respect to the subject, and may assign a second class label indicating safety.

Additionally, the human behavior recognition system 1 additionally defines a robot response class for a plurality of image data for which a behavior class and a safety class are defined, by using the robot response class definer 150. The robot response class is a type of response to be performed by the care robot according to a recognized behavior of the subject.

A plurality of robot response classes are formed by sub-setting the plurality of images according to robot responses for interacting with the subject of the image based on the behavior class and the safety class defined for the plurality of images, and response label data is additionally assigned to the plurality of images.

A response of the robot designated as the robot response class may include at least one of, for example, silence, utterance, attention, and report. In an emergency situation, the report may include notifying the emergency situation to at least one of a guardian, a hospital, and 119.

In a specific example, when the subject of the image watches TV, the safety class definer 130 assigns a second class label to the image by defining the behavior as a second class indicating safety, and thus the robot response class definer 150 assigns a response label indicating "silence".

In another example, when the subject of the image falls, the safety class definer 130 assigns a first class label to the image by defining the behavior as a first class indicating danger, and thus the robot response class definer 150 assigns a response label indicating "report".

In an embodiment, the robot response class definer 150 may define a robot response class based on a safety index calculated by the safety class definer 130. For example, referring to FIG. 4, a first class label indicating danger may be assigned to the subject's "cooking" and "falling" behaviors by the safety class definer 130. However, for the "falling" behavior with a relatively low safety index, the robot response class definer 130 may assign a response label indicating "report" to the image. That is, as the safety index increases from 0 to 1, the robot response class may be defined as "report", "attention", "utterance", and "silence".

As such, the human pose recognition system 1 may hierarchically define classes of image data in the order of a behavior aspect, a safety aspect, and a robot response aspect (or the order of the behavior aspect and the safety aspect).

Also, in the human behavior recognition system 1, image data of an emergency behavior may be generated by rendering an augmented model that implements the emergency behavior in a virtual space. The image data of the emergency behavior includes an image in which an emergency situation is depicted. This is to secure more training data for training the behavior recognition model because there are few open data including emergency behaviors.

The image depicting the emergency situation generated by rendering the augmented is an image in which a virtual object implemented in the virtual space and a real subject interact in augmented reality. The virtual object implemented in the virtual space may be an object with a high degree of danger including, for example, a knife, a knot, and a poison container.

Figure 5:
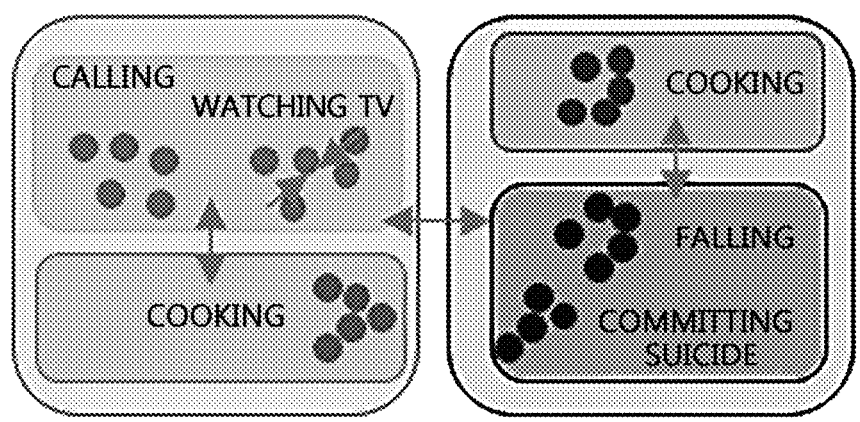
FIG. 5 is a conceptual diagram of training data that hierarchically defines classes through hierarchical sub-setting of FIG. 4.

FIG. 5 is a conceptual diagram of training data that hierarchically defines classes through hierarchical sub-setting of FIG. 4.

Figure 1:
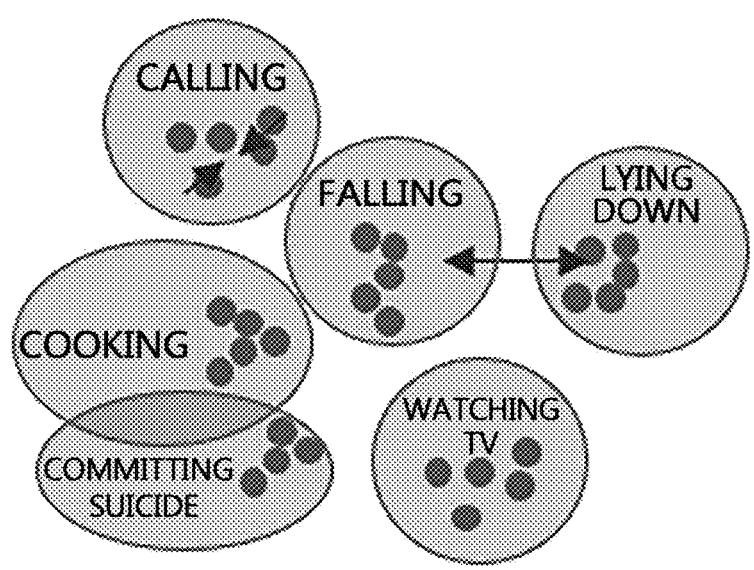
FIG. 1 is a diagram illustrating classes of training data to be used to train a conventional behavior recognition model.

Referring to FIG. 5, for a plurality of image data, classes in a behavior aspect, a safety aspect, and a response aspect of a robot for interacting with a subject are hierarchically defined by the class definers 110, 130, 150. Conventional image data may be defined as a single class of a behavior aspect as shown in FIG. 1, whereas in the human behavior recognition system 1, single image data may be included in multiple classes of a plurality of aspects as shown in FIG. 5.

The trainer 200 trains a behavior recognition model by using a plurality of image data that are hierarchically defined to have multiple classes as training data.

The behavior recognition model includes a deep neural network for extracting features in image data. For example, the behavior recognition model may include a convolutional neural network (CNN) or a recurrent neural network (RNN).

In an embodiment, the behavior recognition model may include a graph convolutional neural network.

The graph convolutional neural network includes a graph convolutional layer and a fully-connected layer, and a readout layer located between the graph convolutional layer and the fully-connected layer, defined through graph convolution.

A pixel in image data may be treated as a node. The image data may be treated as a graph in which connection between modes is regular and a feature of each node is represented in a color code (e.g., RGB).

The graph convolutional neural network converts the node included in the graph or the graph itself into vector data by using graph convolution.

The readout layer is a function of converting a feature map (e.g., a latent feature matrix) generated through the graph convolutional layer into one vector representing the entire graph. In general, the readout layer averages latent feature vectors of all nodes and generates one vector representing the entire graph.

The trainer 200 trains on a parameter included in the graph convolutional neural network, by using image data that are hierarchically defined as shown in FIGS. 4 and 5 as training data.

Figure 6:
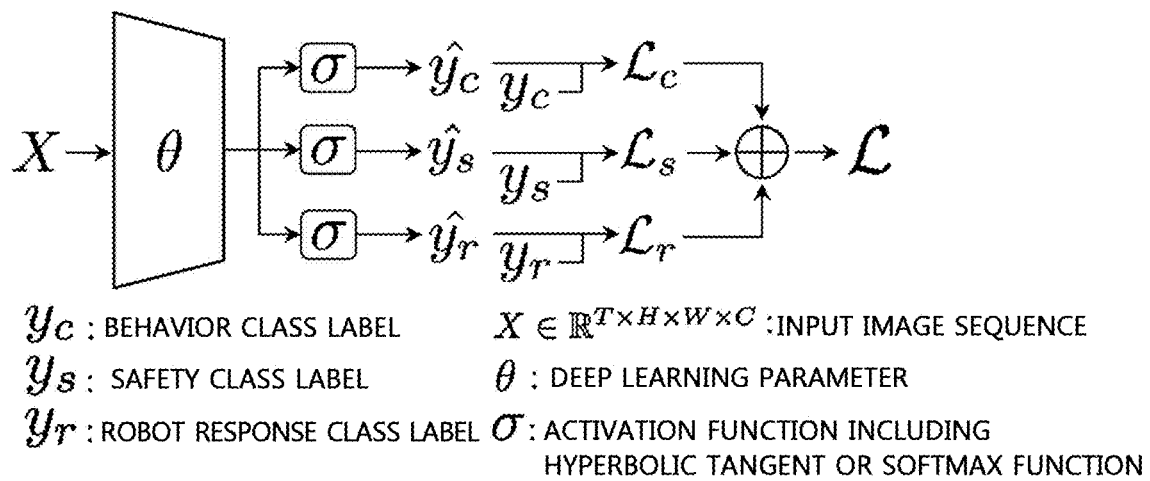
FIG. 6 is a diagram for describing a training process of a behavior recognition model, according to an embodiment of the present disclosure.

FIG. 6 is a diagram for describing a training process of a behavior recognition model, according to an embodiment of the present disclosure.

Referring to FIG. 6, the trainer 200 is trained to minimize an error between an output value of a behavior recognition model and an actual value. In FIG. 6, hat (^) refers to an actual value of a corresponding parameter.

The output value of the behavior recognition model depends on a behavior class, a safety class, and a robot response class. For example, the error between the output value of the behavior recognition model and the actual value is based on a first sub-error $L_c$, between an output value of a behavior class aspect and an actual value, a second sub-error $L_s$ between an output value of a safety class aspect and an actual value, and a third sub-error $L_r$ between an output value of a robot response class aspect and an actual value.

The trainer 200 may train the behavior recognition model by minimizing the first sub-error, the second sub-error, and/or the third sub-error, or minimizing the total error.

Through this training process, the behavior recognition model recognizes a behavior of a subject by considering not only a motion aspect of the subject but also a safety aspect.

When image data that are hierarchically defined are used as training data as shown in FIGS. 4 and 5, parameters included in the behavior recognition model are trained as a value for the behavior recognition model to recognize a human behavior by considering safety and determine a robot response for interacting with the human behavior recognized by considering the safety.

The parameters included in the behavior recognition model include a deep learning model parameter θ and a hyper-parameter σ (e.g., an activation function including a hyperbolic tangent or softmax function).

Figure 7:
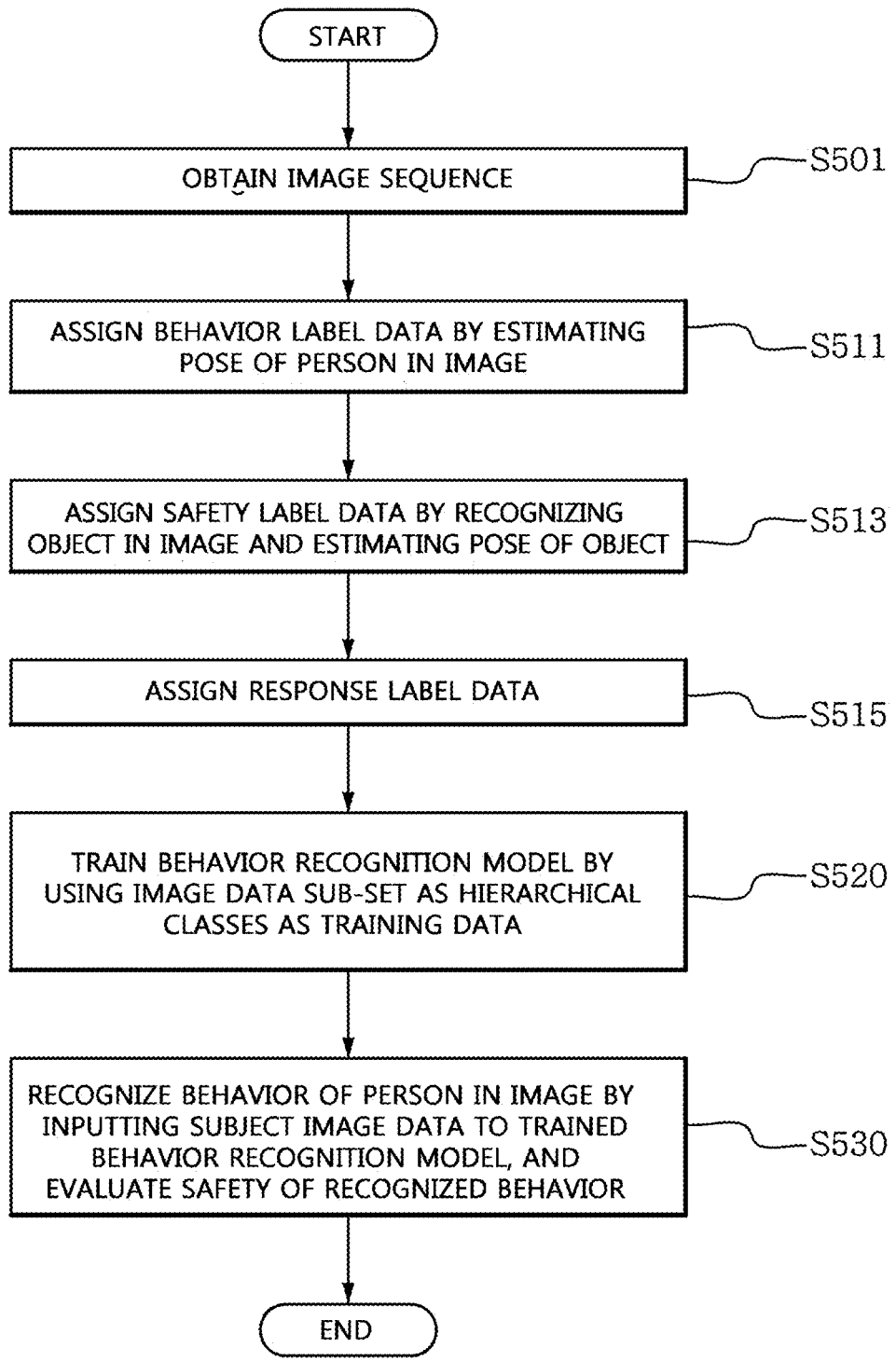
FIG. 7 is a flowchart illustrating a human behavior recognition method, according to an embodiment of the present disclosure.
Figure 8:
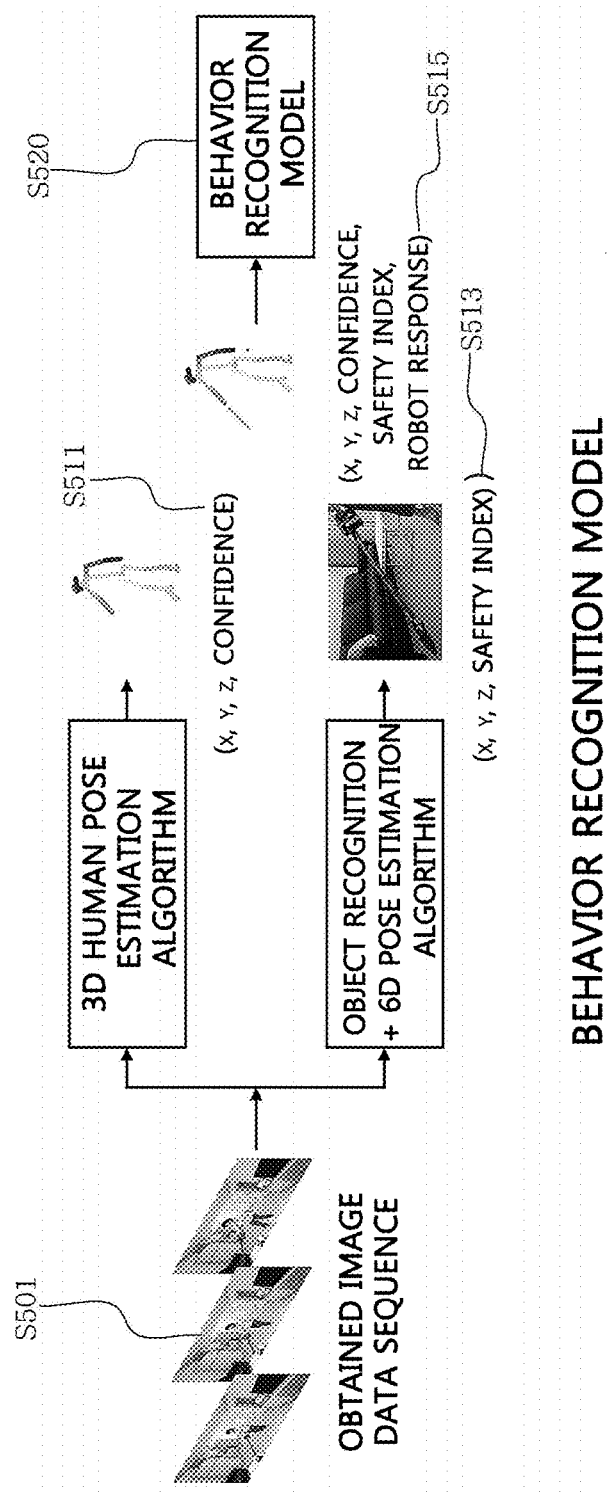
FIG. 8 is a conceptual diagram illustrating the human behavior recognition method of FIG. 7.

FIG. 7 is a flowchart illustrating a human behavior recognition method using hierarchical class learning considering safety, according to an embodiment of the present disclosure. FIG. 8 is a conceptual diagram illustrating the human behavior recognition method of FIG. 7.

The human behavior recognition method using the hierarchical class learning considering safety (hereinafter, "human behavior recognition method") is performed by a computing device including a processor. The computing device including the processor may be performed by the human behavior recognition system 1, may be performed by some elements (the behavior class definer 110, the safety class definer 130, the robot response class definer 150, the trainer 200, or the recognizer 300), or may be performed by another computing device. Hereinafter, for clarity of description, embodiments of the present disclosure in which the human behavior recognition method is performed by the human behavior recognition system 1 will be described in more detail.

As shown in FIG. 7, the human behavior recognition method may include: a step S501 of obtaining an image sequence including a subject; a step of S511 of assigning behavior label data by estimating a pose of a person in an obtained image (e.g., by using the behavior class definer 110); a step of S512 of assigning safety label data by recognizing an object in the image and estimating a pose of the object (e.g., by using the safety class definer 130): a step of S513 of assigning response label data (e.g., by using the robot response class definer 150): a step of S520 of training a behavior recognition model by using image data sub-set as hierarchical classes as training data (e.g., by using the trainer 200): and a step of S530 of recognizing a behavior of the person in the image by inputting subject image data to the trained behavior recognition model and evaluating the safety of the recognized behavior (e.g., by using the recognizer 300).

Referring to FIG. 8, the step S511 may include a 3D human pose estimation algorithm for recognizing a behavior taken by the subject, by estimating a pose of the subject by estimating a joint position of the subject in the image. Information to be used to estimate the pose may include, for example, position information of a joint. Also, in some embodiments, a pose estimation result may further include a confidence score related to the position of a joint for each pixel in input data. When the position information of the joint is obtained by the 3D human pose estimation algorithm, (x, y, z) that is 3D position information of the joint, the confidence score and a behavior label are associated with the input image.

The step S513 may include an object recognition sub-model for recognizing an object in the image, and a 6D pose estimation algorithm for estimating a pose of the object. The step S513 involves calculating a safety index indicting whether the subject in the image is in a safe situation or a dangerous situation based on a recognized human behavior and an estimated object pose, associating safety label data with a pose estimation result including 6D position information of the object, and additionally assigning safety label data to the image data. Accordingly, (x, y, z) that is 6D position information of the object and a safety label are associated with the input image.

The step of S515 involves additionally assigning a response label to the input image, and the step S520 involves training the behavior recognition model by using an image defined as hierarchical classes according to the behavior label, the safety label, and the response label as training data.

When the input image is input by using the behavior recognition model trained through this process, the recognizer 300 may more accurately recognize the behavior of the subject in the input image.

When the input image is input, the behavior recognition model outputs a behavior recognition result of the subject in the input image and a safety evaluation result indicating whether the subject is in an emergency situation. The safety evaluation result corresponds to a safety class to which the input subject belongs.

In particular, because the behavior recognition model is trained about the same or similar behaviors of the subject such as "falling" and "lying down" in a safety aspect by using safety label data, the behavior recognition model does not mistake "falling" as "lying down".

For example, even when an image in which the subject falls is input, because the conventional behavior recognition model of FIG. 2 is trained only in a motion-based behavior aspect without being trained in a safety aspect, the conventional behavior recognition model mistakes "falling" as "lying down". However, the recognizer 300 accurately recognizes a behavior related to an emergency situation such as "falling" as a "falling" behavior, and does not mistake "falling" as a "lying down" behavior related to a non-emergency situation.

Also, even when an input image in which the subject hangs himself/herself in a standing state is input, the conventional behavior recognition model of FIG. 2 mistakes the behavior as "getting up" based on the standing state. However, the recognizer 300 evaluates safety by recognizing a chair used for hanging, and accurately recognizes the behavior as "hanging" even in the standing state.

In addition, the behavior recognition model may output a robot response in addition to the behavior recognition result and the safety evaluation result. This is because the behavior recognition model is also trained about a robot response class based on the behavior and the safety.

The behavior recognition system 1 may transmit a command for performing a suitable operation for interaction with the recognized behavior of the subject to a care robot. The command is based on the robot response output from the behavior recognition model.

When the input image of "hanging" or "falling" is input in the above example, the recognizer 300 outputs a robot response corresponding to report along with the behavior recognition result of the subject and the safety evaluation result in the input image. The behavior recognition system 1 may transmit a command for performing a report operation such as making a call to a pre-designated contact (e.g., 119) to the care robot.

The human behavior recognition method may be implemented as an application or may be implemented as program instructions executable by various computer components and may be recorded on a computer-readable recording medium. The computer-readable recording medium may include program instructions, data files, data structures, and the like separately or in combinations.

The program instructions recorded on the computer-readable recording medium may be specially designed and configured for the present disclosure or may be well-known to and be usable by one of ordinary skill in the art of computer software.

Examples of the computer-readable recording medium include a magnetic medium such as a hard disk, a floppy disk, or a magnetic tape, an optical medium such as a compact disk read-only memory (CD-ROM) or a digital versatile disk (DVD), a magneto-optical medium such as a floptical disk, and a hardware device specially configured to store and execute program instructions such as a ROM, a random-access memory (RAM), or a flash memory.

Examples of the program instructions include advanced language codes that may be executed by a computer by using an interpreter or the like as well as machine language codes made by a compiler. The hardware device may be configured to operate as one or more software modules in order to perform the operation of the present disclosure, and vice versa.

While the present disclosure has been particularly shown and described with reference to exemplary embodiments thereof, they are provided for the purposes of illustration and it will be understood by one of ordinary skill in the art that various modifications and equivalent other embodiments may be made from the present disclosure. It should be understood that such modifications are included in the technical scope of the present disclosure. Accordingly, the true technical scope of the present disclosure is defined only by the accompanying claims.

What is claimed is:

1. A human behavior recognition system using hierarchical class learning considering safety, the human behavior recognition system comprising:
    a behavior class definer configured to form a plurality of behavior classes by sub-setting a plurality of images each comprising a subject according to pre-designated behaviors and assign a behavior label to the plurality of images, wherein each behavior class comprises images with same or similar behaviors of the subject, and a same behavior label is assigned to images included in a same behavior class;
    a safety class definer configured to calculate a safety index for the plurality of images, form a plurality of safety classes by sub-setting the plurality of images based on the safety index, and additionally assign a safety label to the plurality of images, wherein an object different from the subject in the image is recognized and the safety index is evaluated based on a pose of the recognized object with respect to the subject; and
    a trainer configured to train a human recognition model by using the plurality of images defined as hierarchical classes by assigning the behavior label and the safety label as training images.

2. The human behavior recognition system of claim 1, further comprising a robot response class definer configured to, based on the behavior class and the safety class defined for the plurality of images, form a plurality of robot response classes by sub-setting the plurality of images according to robot responses for interacting with the subject of the image, and additionally assign a response label to the plurality of images,
    wherein the trainer is further configured to train the behavior recognition model by using the plurality of images defined as hierarchical classes by assigning the behavior label, the safety label, and the response label as training images.

3. The human behavior recognition system of claim 1, further comprising a recognizer configured to recognize a behavior of a person in the image by inputting subject image data to the trained behavior recognition model, and evaluate safety of the recognized behavior.

4. The human behavior recognition system of claim 1, wherein the plurality of behavior classes comprise one or more behavior classes related to a real life situation and one or more behavior classes related to an emergency situation,
    wherein the emergency situation comprises at least one of suicide and accident.

5. The human behavior recognition system of claim 4, wherein the plurality of images comprise images depicting the emergency situation,
    wherein at least one of the images depicting the emergency situation is generated by rendering an augmented model that implements an emergency behavior in a virtual space.

6. The human behavior recognition system of claim 5, wherein the at least one image depicting the emergency situation, generated by rendering the augmented model is an image in which a virtual object implemented in the virtual space and a real subject interact with each other in an augmented reality.

7. The human behavior recognition system of claim 1, wherein the behavior class definer comprises a three-dimensional (3D) human pose estimation algorithm for calculating position information of a joint of the subject and recognizing a behavior of the subject based on the calculated position information of the joint.

8. The human behavior recognition system of claim 7, wherein the 3D human pose estimation algorithm is further configured to output a reliability score related to a position of the joint for each pixel in an input image.

9. The human behavior recognition system of claim 1, wherein the safety class definer comprises: an object recognition sub-model for recognizing the object; and a six-dimensional (6D) pose estimation algorithm for estimating a pose of the object to calculate a safety index,
    wherein the safety label comprises a first label indicating safety or a second label indicating emergency.

10. The human behavior recognition system of claim 1, wherein the behavior recognition model comprises a graph convolutional neural network, wherein the trainer is further configured to train on a parameter included in the graph convolutional neural network, by using hierarchically defined image data as training data.

11. A human behavior recognition method using hierarchical class learning considering safety performed by a processor, the human behavior recognition method comprising:
 a step of obtaining a plurality of images each comprising a subject;
 a behavior class defining step of forming a plurality of behavior classes by sub-setting the plurality of images each comprising the subject according to pre-designated behaviors and assigning a behavior label to the plurality of images, wherein each behavior class comprises images with same or similar behaviors of the subject, and a same behavior label is assigned to images included in a same behavior class;
 a safety class defining step of calculating a safety index for the plurality of images, forming a plurality of safety classes by sub-setting the plurality of images based on the safety index, and additionally assigning a safety label to the plurality of images, wherein an object different from the subject in the image is recognized and the safety index is evaluated based on a pose of the recognized object with respect to the subject; and
 a training step of training a behavior recognition model by using the plurality of images defined as hierarchical classes by assigning the behavior label and the safety label as training images.

12. The human behavior recognition method of claim 11, further comprising a robot response class defining step of, based on the behavior class and the safety class defined for the plurality of images, forming a plurality of robot response classes by sub-setting the plurality of images according to robot responses for interacting with the subject in the image, and additionally assigning a response label to the plurality of images,
 wherein the training step comprises training the behavior recognition model by using the plurality of images defined as hierarchical images by assigning the behavior label, the safety label, and the response label as training images.

13. The human behavior recognition method of claim 11, further comprising a recognizing step of recognizing a behavior of a person in the image by inputting subject image data to the trained behavior recognition model, and evaluating safety of the recognized behavior.

14. The human behavior recognition method of claim 11, wherein the plurality of behavior classes comprise one or more behavior classes related to a real life situation and one or more behavior classes related to an emergency situation,
 wherein the emergency situation comprises at least one of suicide and accident.

15. The human behavior recognition method of claim 14, wherein the plurality of images comprise images depicting the emergency situation,
 wherein at least one of the images depicting the emergency situation is generated by rendering an augmented model that implements an emergency behavior in a virtual space.

16. The human behavior recognition method of claim 15, wherein the at least one image depicting the emergency situation, generated by rendering the augmented model is an image in which a virtual object implemented in the virtual space and a real subject interact with each other in an augmented reality.

17. The human behavior recognition method of claim 11, wherein a behavior class definer comprises a three-dimensional (3D) human pose estimation algorithm for calculating position information of a joint of the subject and recognizing a behavior of the subject based on the calculated position information of the joint.

18. The human behavior recognition method of claim 17, wherein the 3D human pose estimation algorithm is further configured to output a confidence score related to a position of the joint for each pixel in an input image.

19. The human behavior recognition method of claim 11, wherein a safety class definer comprises: an object recognition sub-model for recognizing the object; and a six-dimensional (6D) pose estimation algorithm for estimating a pose of the object to calculate a safety index,
 wherein the safety label comprises a first label indicating safety or a second label indicating emergency.

20. The human behavior recognition method of claim 11, wherein the behavior recognition model comprises a graph convolutional neural network,
 wherein the training step comprises training on a parameter included in the graph convolutional neural network, by using hierarchically defined image data as training data.

21. A computer-readable recording medium having embodied thereon a program for executing the human behavior recognition method according to claim 11.

* * * * *